United States Patent [19]
Bubeck

[11] Patent Number: 4,750,960
[45] Date of Patent: Jun. 14, 1988

[54] ROBOTIC WINDING SYSTEM AND METHOD

[75] Inventor: Kenneth B. Bubeck, Troy, N.Y.

[73] Assignee: Rensselaer Polytechnic Institute, New York, N.Y.

[21] Appl. No.: 904,623

[22] Filed: Sep. 8, 1986

Related U.S. Application Data

[63] Continuation of Ser. No. 649,127, Sep. 10, 1984, abandoned.

[51] Int. Cl.$^4$ .............................................. B65H 81/00
[52] U.S. Cl. ..................................... 156/169; 156/425
[58] Field of Search ............... 156/433, 425, 173, 175, 156/172, 166, 361, 353; 242/7.02, 7.21, 7.22, 7.09; 901/5, 28, 29

[56] References Cited
U.S. PATENT DOCUMENTS

| | | | |
|---|---|---|---|
| 3,616,070 | 10/1971 | Lemelson | 156/173 |
| 3,701,489 | 10/1972 | Goldsworthy et al. | 156/175 |
| 3,741,489 | 6/1973 | Kawamura et al. | 242/18 R |
| 4,145,740 | 3/1979 | McClean | 156/175 |
| 4,249,704 | 2/1981 | Sakaue et al. | 156/425 |

OTHER PUBLICATIONS

Merritt, Instruments and Control Systems, Jul. 1982, Industrial Robots: Setters Smarter, p. 32.
Tsai et al, Journal of Mechanical Designs, Oct. 1981, vol. 103, p. 803, "Accessible Region and Synthesis of Robot Arms".

*Primary Examiner*—Michael Ball
*Attorney, Agent, or Firm*—McGlew and Tuttle

[57] ABSTRACT

A winding system for winding a filament includes a winder having a winder support with a rotatably winding head. A spool for scoring filament is rotatably mounted on the head and the head is provided with a filament dispensing eye which can be rotated in a circular path for winding a mandrel. The mandrel is held at a fixed location. A robot mnaipulator arm is connected to the winder and indexes the winder to a plurality of positions around the fixed mandrel. At each selected position, the winding head is rotated by a selected amount to achieve any complex or simple winding cofiguration, in a plurality of planes.

21 Claims, 5 Drawing Sheets

ROBOTIC WINDING SYSTEM AND METHOD

This is a continuation of application Ser. No. 649,127 filed Sept. 10, 1986 now abandoned.

FIELD AND BACKGROUND OF THE INVENTION

The present invention relates in general to filament winders and in particular to a new and useful winding system which utilizes a robot arm to index a winding head at selected locations around a fixed mandrel, for winding the mandrel with filament in a selected and, if desired, complex pattern.

Various configurations for a winding head which is useful in winding filaments or fibers around a mandrel are known. Examples can be found in U.S. Pat. Nos. 3,701,489 and 3,741,489.

U.S. Pat. No. 4,145,740 is also relevant for its showing of a controllable winding head.

Substantially all other prior art winders require some movement on the part of the mandrel to be wound, in addition to movements of the winding head.

A comprehensive discussion of filament winders can be found in the course notes for a course entitled "Composites in Machine Element" given by Dr. G. D'Andrea at RPI in Troy, N.Y.

Among the simplest winders utilizes a mandrel which is mounted for rotation about its axis and a winding head for supplying a filament that is slidably movable parallel to the axis and next to the mandrel. A helical winding pattern can be established on the mandrel by moving the winding head back and forth. A mandrel can also be wound with the winding head moving slowlin in one direction along the rotatational axis of the mandrel. This is known as circumferential or hoop winding.

Polar winders are known which rotate the mandrel on an axis which is perpendicular to the longitudinal axis of the mandrel. A filament can then be wound in a direction which is at a small angle to the axis of the mandrel and from end to end around the mandrel until the mandrel is covered.

A continuous helical winding of a mandrel can be achieved by rotating the mandrel about its longitudinal axis and, at the same time, moving the mandrel parallel to its longitudinal axis. One or more fixed winding heads can be provided for supplying filament to the periphery of the mandrel. In this way, a mandrel which is being extruded from a forming machine can be helically wound with a filament or ribbon.

In addition to the foregoing helically wound filament or ribbon, an axially extending ribbon can be provided to the surface of the mandrel before it is wound also in a helical direction.

A continuous rotating mandrel can also be utilized for a helical winding and is known as a Drostholm wrap. In this process the mandrel rotates and the filaments are added from a stationary reel which is at a slight angle to a direction perpendicular to the axis of the mandrel. The wrap advances axially and helically on the mandrel.

Fiber-placement machines are also known which can produce a more complicated winding pattern for a fiber or filament. Such devices are useful when utilizing costly boron fiberepoxy tapes for filament winding. Such tapes are utilized to increase the strength of a mandrel that is usually adapted for high speed rotation, such as a flywheel or helicopter rotor hub.

Such devices can lay down tape in the X,Y and Z coordinates. Such machines generally require a tape dispenser which has 6° of freedom and is capable of placing tape within plus or minus 0.01 inches of a desired path. Considerable expense and some problems have been encountered in such devices however. Such devices are particularly useful in the aircraft and aerospace industries which have begun to utilize high strength continuous filaments to reinforce various structural elements.

In addition to the foregoing known winders, loop-wrap winders are known which place filaments into loops for products such as tension straps for guy lines.

Braid-wrap winders supply a plurality of filaments or tapes which are wrapped, in maypole fashion over a mandrel which can, for example, be made of plastic, glass or other material which requires reinforcement.

Inside-wrap winders are also known. These utilize a process wherein filaments of reinforcing material are applied in a programmed manner to the inside of a rotating mandrel.

Tumbling-type machines are also utilized which move a mandrel in a complex tumbling path. This is used in conjunction with a fixed filament supply head for placing strands of the fiber one next to the other around the mandrel.

Planetary winding machines are also utilized having a support which carries a fiber supplying eye and also a spool of fiber. The support is rotated around the mandrel which itself is also rotated to wrap and cover the mandrel with fiber. Such winders are particularly useful in winding spherical or spheroid mandrels.

Finally, a winding process known as the Strickland B winding process utilizes a conical mandrel which can be rotated both about its longitudinal axis and on an axis transverse to its longitudinal axis, in conjunction with a winding head which can be moved parallel to the axis of the conical mandrel. By using such a device both radial and longitudinal windings of the conical surface can be achieved.

As previously noted, substantially the known winding techniques utilize some motion of the mandrel. The techniques are also similar in that mandrels are generally symmetrical at least about one axis.

The benefits of using high modulus, low density composites in structural applications have resulted in innovations which utilize reinforced plastics in the aerospace, automotive and energy related industries. Such industries utilize structural elements which are often quite complex in shape and cannot easily be wound by known winding techniques and devices. This is despite the fact that such complex structures can be strengthened drastically by the use of filament windings or maintaining low weight for such structures.

SUMMARY OF THE INVENTION

An object of the present invention is to provide a winding mechanism and technique which utilizes a robot or robot-like mechanism for indexing, that is accurately positioning a winding head at any selected position around a fixed mandrel so that even highly complex windings can be achieved. A fixed mandrel can be wound in all three orthogonal planes utilizing the invention. A robot manipulator can be used to align the winding mechanism with any rotational plane.

Most standard and well developed robot systems can be used which offer six degrees of freedom and can be programmed relatively easily. According to the invention, the winding head is provided with a drive mechanism that can also be driven in a programmed fashion. Such a driving unit may include a stepping or other accurately controllable motor which can be controlled for example by a personal computer which operates in conjunction with the robot controls for wrapping a fixed mandrel in any desired fashion.

Accordingly a further object of the invention is to provide a winding system for winding a filament or fiber on a mandrel, comprising, a winder support, a winding head rotatably mounted to the winder support for dispensing a filament or fiber, drive means connected to the winding head for rotating the winding head, and robot means having a manipulator connected to the winder support for indexing the winder support at a plurality of selected locations around the mandrel to be wound with fiber or filament.

A further object of the invention is to provide such a system wherein a mandrel support is utilized which supports the mandrel in a fixed position.

Another object of the invention is to provide a winding arrangement for use with a robot manipulator which comprises a cylindrical winder support, a winding frame rotatably mounted to the support, a spool rotatably mounted to the frame for storing or dispensing filament, a filament eye connected to the frame for guiding a filament from the spool in a circular path with rotation of the frame and drive means connected to the frame for rotating the frame in the winder support.

Another object of the invention is to provide a method of winding a mandrel comprising indexing a winder at a first selected position adjacent a fixed mandrel, utilizing a robot manipulator, at least partially winding the mandrel with a filament, and moving the winder to a second position using the robot manipulator so that the mandrel can be wound further with filament, these steps being repeatable a selected number of times until a selected pattern of filament is wound on the fixed mandrel.

Another object of the invention is to provide a winding system which is simple in design, rugged in construction and economical to manufacture.

The various features of novelty which characterize the invention are pointed out with particularly in the claims annexed to and forming a part of this disclosure. For a better understanding of the invention, its operating disadvantages, and specific objects attained by its uses, reference is made to the accompanying drawings and descriptive matter in which preferred embodiments of the invention are illustrated.

DESCRIPTION OF THE PREFERRED EMBODIMENTS

Figure 1:
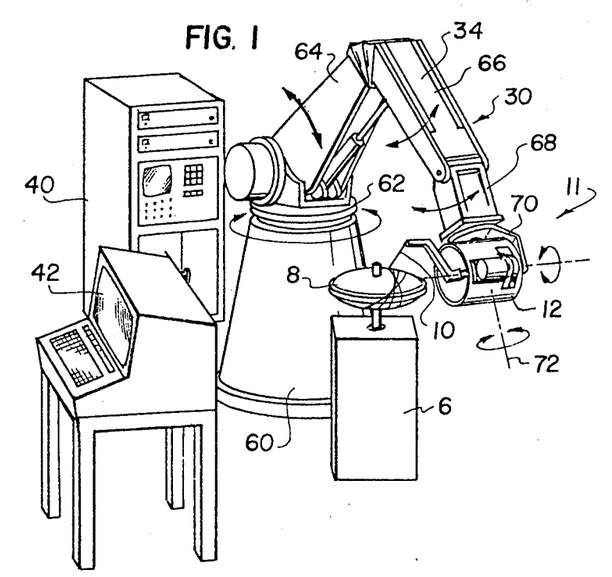
FIG. 1 is a perspective representation of a winding system in accordance with the invention.

Referring to the drawings in particular, the invention embodied in FIG. 1 comprises a winding system which utilizes robot means, generally designated 30, which include a robot manipulator arm 34. Manipulator arm 34 is connected to a winder or end effector generally designated 11. The winder 11 dispenses a filament or fiber 10 which may be monofilament, multifilament or any other desired elongated reinforcing member. Examples of such fibers which are used for reinforcing purposes are Kevlar (a tradename) filament or boron filament.

In FIG. 1 the filament is shown being wound around a disc-shaped mandrel 8 which can, for example, be a flywheel to be reinforced with filament windings. Mandrel 8 is mounted in a fixed position on a mandrel base or support 6.

As will be explained in greater detail hereinunder, robot manipulator arm 34 is controllable by its own known control cabinet. Drive means for rotating a winding head rotatably mounted in winder 11 can be controlled with a micro or personal computer 42 which is used in concert with the robot control cabinet 40 for winding filament 10 in any desired pattern around the fixed mandrel 8.

In accordance with the invention, the robot arm 34 is used as an indexing mechanism for positioning the open end of the winder 11 at any desired location with respect to the mandrel 8. Once positioned, a winding head 14 (see FIG. 3) is rotated by a selected amount to fully or partially wind fiber around the mandrel, or even wind the fiber a plurality of times around the mandrel. The robot arm can then be moved to a second location for further winding, and so on.

Six degrees of freedom can be provided by the robot arm. An example of a known robot manipulator which can be used is the Cincinnati Milacron T3 (a tradename).

The arm 34 advantageously includes a base 60 forming a fixed frame of reference. A turntable 62 is rotatably mounted in the direction of a double arrow shown in FIG. 1, on base 60.

A first limb 64 is pivotally mounted on turntable 62 and a second limb 66 is pivotally mounted on limb 64. Finally, a third limb 68 is pivotally mounted on the end of second limb 66. Limb 68 is provided with a rotatable connection 70 which can rotate about the axis 72 in the direction of the double arrow shown around axis 72. By the use of these three limbs and the rotatable connection as well as the turntable 62, winder 11 can be indexed to any selected location around the mandrel 8.

Figure 2:
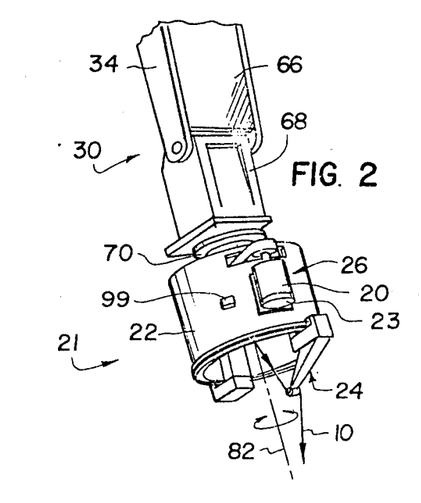
FIG. 2 is a fragmentary perspective view showing another embodiment of the invention.

FIG. 2 shows an alternate embodiment for the winder, designated 21, which includes a winder support 22 in which is rotatably mounted a winding head 24 for supplying filament 10. Winding head 24 can be rotated by drive means 26 and is connected with its rotational axis 82 parallel and coaxial with the axis of rotatable connection 70. A part of the second limb 66 for the robot manipulator 34 is shown as well as the third limb 68. While the embodiment of FIG. 2 has one less degree of freedom than the embodiment of FIG. 1, it is useful for special purpose applications where a less complex pattern of winding is required.

Figure 3:
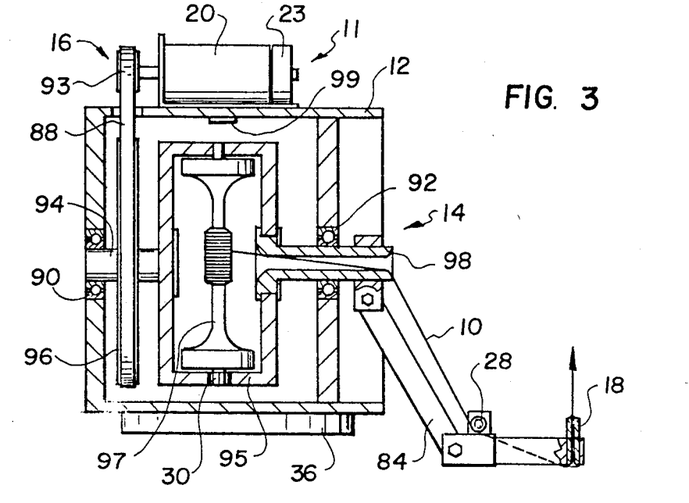
FIG. 3 is a longitudinal sectional view of the filament winder or end effector.

As shown in FIG. 3, winder 11 comprises winder support 12 which is in the form of a cylinder having an open end (to the right of FIG. 3). Winding head 14 is rotatably mounted through bearings 90 and 92 to the interior of support 12. Winding head 14 includes a shaft 94 which carries a toothed gear 96. Connected to shaft 94 is a spool cage 95 which rotatably receives a spool 97. Filament 10 is wound on the spool and can be threaded through an opening in a second shaft 98 which is coaxial to shaft 94. Filament 10 is supplied to a winding arm 84 which carries a filament eye 18. Shaft 94 and thus filament eye 18 is rotated by drive means 16 in the form of a precision motor 20 which may, for example be a stepping motor. Connected to the shaft of motor 20 is a toothed gear 93. Toothed gear 93 is connected to toothed gear 96 by a toothed belt 88 so that accurate rotation of the filament eye 18 can be achieved. Motor 20 can be controlled through well known digital-to-analog conversion interfaces by the personal computer 42 shown in FIG. 1.

Figure 4:
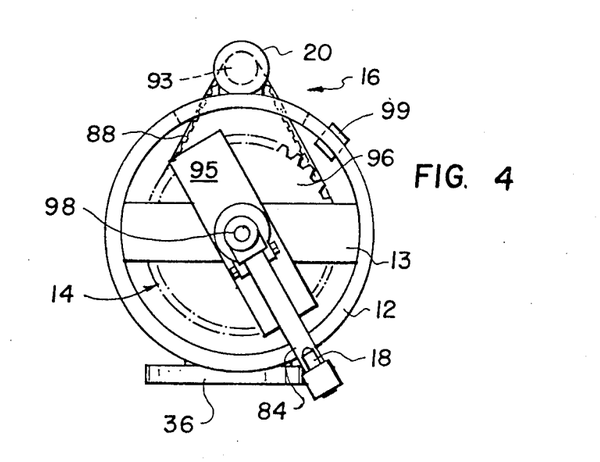
FIG. 4 is a front elevational view of the winder of FIG. 3.

Rollers may be provided for guiding filament 10 along the arm 84 and out the filament eye 18. Tensioning means can also be provided for applying a tension to the filament 10. This can either be in the form of a spool tensioning device 30 which can be adjusted to resist rotation of spool 97 in cage 95, or a pinching roller 28 for resisting the advance of filament 10. The embodiment of FIG. 3 differs slightly from the embodiment of FIG. 1 in that a connecting disc 36 is tangentially connected, for example by welding or bolting to the circumference of cylindrical winder support 12. Disc 36 can be bolted directly to rotatable connection 70 of the robot arm 34. In this way, the robot can be used to rotate support 12 on an axis perpendicular to its longitudinal axis (parallel to shafts 94,98). As shown in FIG. 4, bearing 92 for rotatably supporting the winding head 14 over shaft 98, is connected to support 12 by a spider plate 13.

Figure 5:
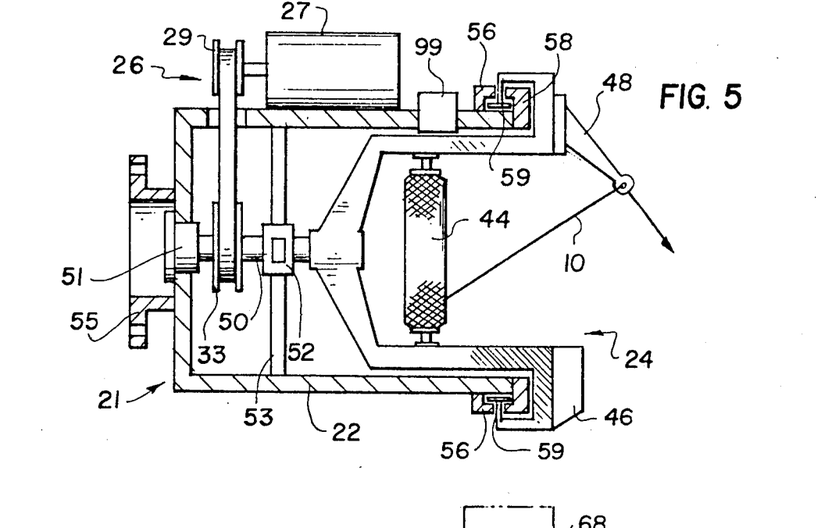
FIG. 5 is a view similar to FIG. 3 showing another embodiment of the winder or end effector.

FIG. 5 shows details of the winder or end effector 21, shown in perspective view in FIG. 2.

Here again the winder support 22 is cylindrical in shape and has an open end in which is rotatably mounted a winding head 24. Winding head 24 is in the form of a winding frame which rotatably receives filament spool 44 which carries and stores filament 10. The frame carries a winding eye 48 which dispenses filament 10. On an opposite side of the frame from eye 48 is a counterweight 46 for balancing eye 48.

The frame is rotatably mounted in support 22 on a shaft 50 rotatable in a first bearing 51 and a second bearing 52. Bearing 52 is fixed in a spider 53 connected in support 22.

A circular flange 55 is fixed to support 22 and can be connected, for example, by bolting to the rotatable connection 70 of the robot manipulator.

A ring shaped track member is connected to the circumference of support 22 at its open end and defines with a track member 58 a channel 57. Slides 59 are slidably mounted in channel 56 both on the end of the frame carrying eye 48 and counterweight 46. This establishes a rotatable mounting for the forward end of the frame in support 22.

Drive means 26 are formed by a precision motor 27 which rotatably carries a toothed gear 29 that is meshed by a toothed belt 31 to a toothed gear 33 fixed on shaft 50. In this way the frame forming winding head 24 can be rotated by any selected angular amount for winding filament 10.

Figures 6, 7:
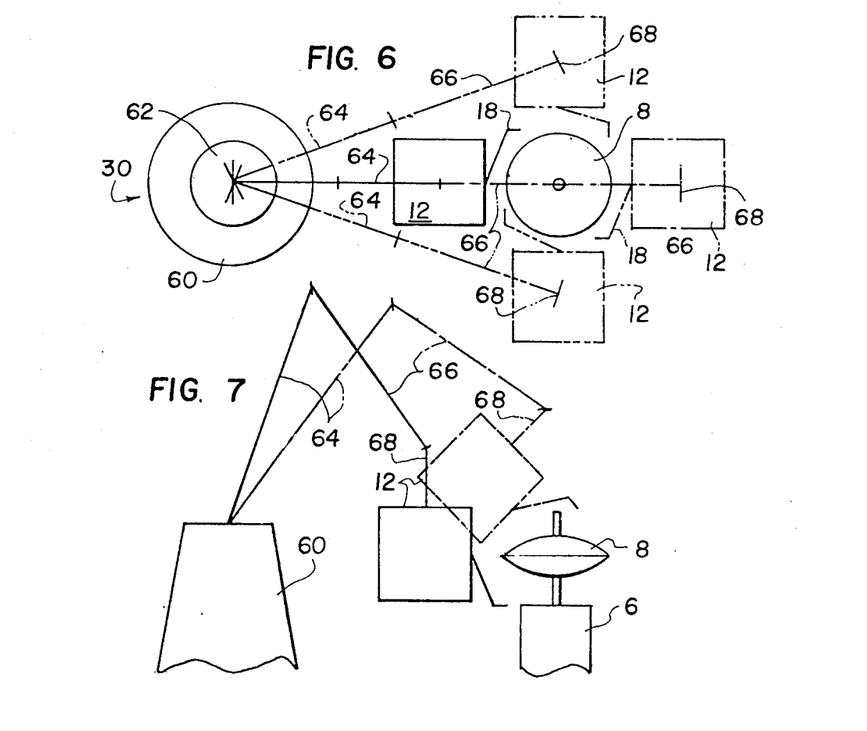
FIG. 6 is a highly schematic, top plan representation of a plurality of positions to which the winder can be indexed by a robot manipulator arm.
FIG. 7 is a view similar to FIG. 6 showing inside elevational view, a plurality of positions to which the winder can be indexed.

FIG. 6 shows four positions to which support 12 can be indexed around mandrel 8 using robot means 30. The first, second and third limbs are shown as lines. The solid line position shows support 12 facing to the right in FIG. 6, but on the left side of mandrel 8. From this position, filament 10 can be wound using eye 18. After each complete 360° rotation of eye 18, the robot arm can move the support 22 gradually until it reaches its double dash line position (above mandrel 8 in FIG. 6). This can be achieved by slightly rotating turntable 64 on base 60 while at the same time extending first and second limbs 64,66 and, with limb 64 extending downwardly (into the page of FIG. 6) incrementally rotating rotatable connection 70. Further like movement can bring support 12 into its single dash line position (to the right of mandrel 8). Further movement can bring support 12 to its triple dash line position (below mandrel 8) and then finally back to solid line position. In this way the mandrel 8 can be fully covered and thus reinforced with filament.

FIG. 7 shows possible vertical movement of the support 12 from a solid line position to a dash line position. In this way, filament can be wound on one side of mandrel 8 or even across its axis of symmetry.

To provide feedback to the personal computer 92, a photoelectric or reflective sensor 99 shown for example in FIG. 2 can be utilized. This provides a signal every time the winder passes as shown in FIGS. 3 and 5. The robot is signaled by the rotating assembly and pauses in its sequencing program until it sees the signal from the sensor. It then continues until the next pause in the program. The sensor is mounted on the winder support with its wire (not shown) going up the robot arm and being connected to an input of the robot controller 40. The signal can be amplified so that the robot will recognize its output voltage.

Figure 8:
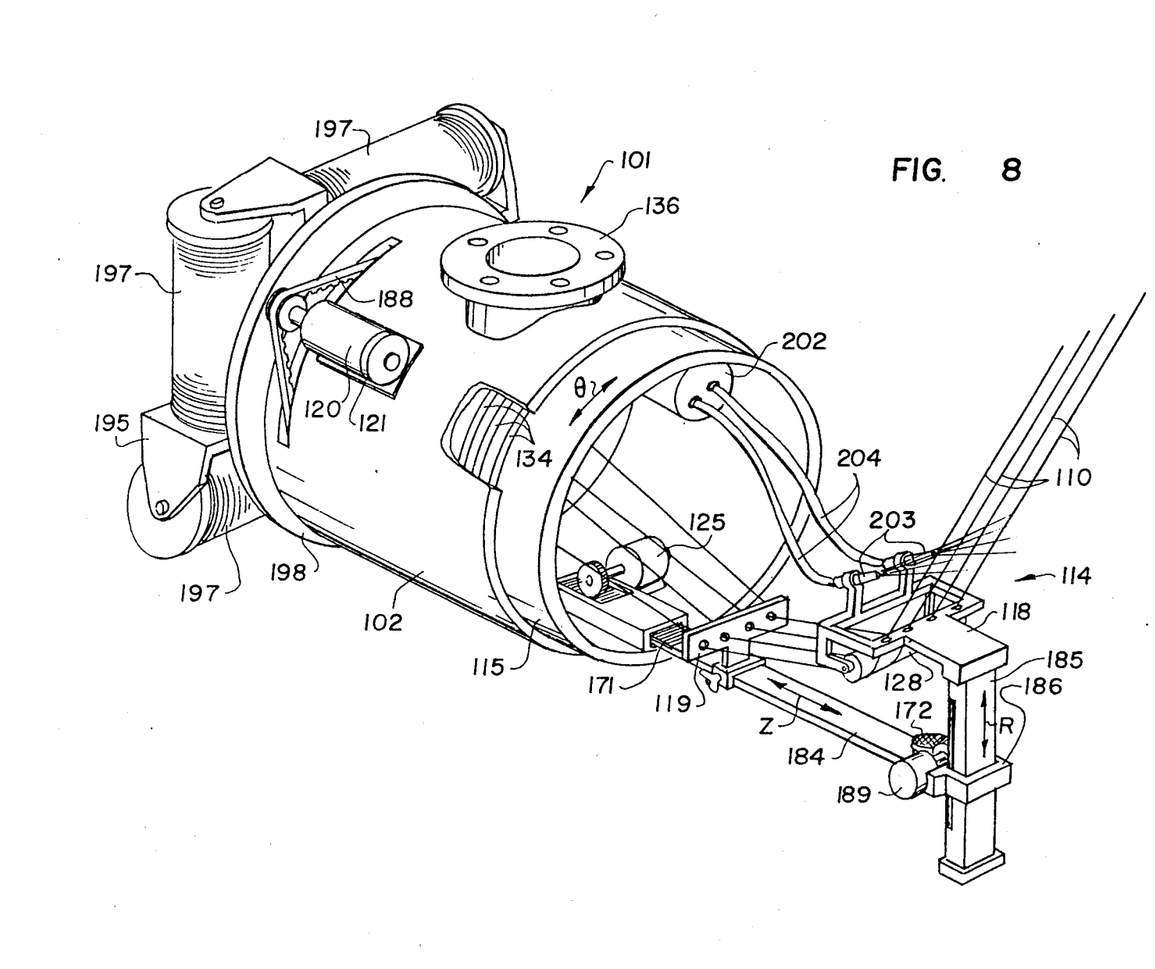
FIG. 8 is a perspective view of another embodiment of the filament winder or end effector.
Figure 9:
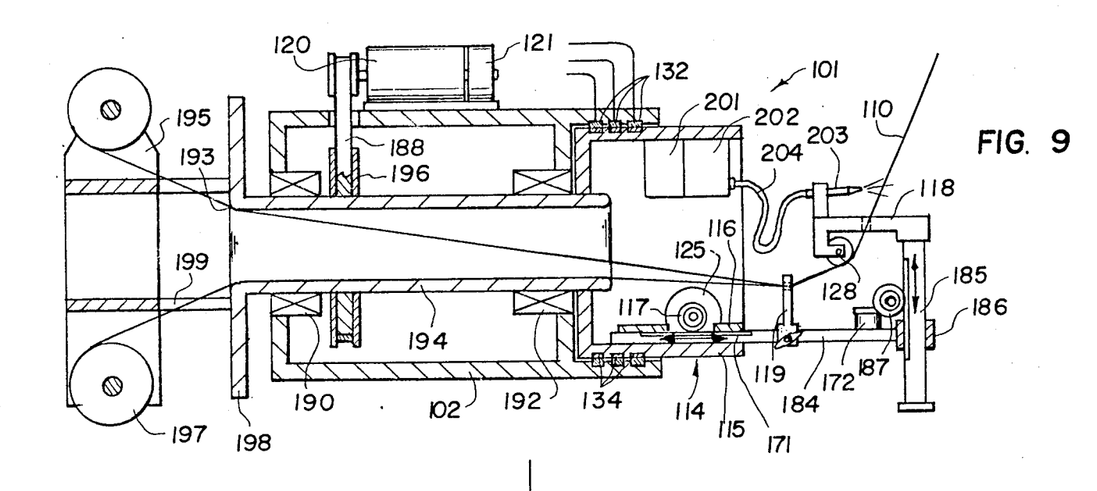
FIG. 9 is a longitudinal sectional view of the winder of FIG. 8.

Another embodiment of the winder is shown in FIGS. 8 and 9. This forms a perferred version of the invention at present.

Advantages of this embodiment of the invention include externally mounted spools. This permits sufficient room so that a plurality of spools can be utilized for feeding a plurality of filaments. The embodiment also includes Z and R movable coordinates which can be used in conjunction with the motor for rotating the winding head to form a cylindrical coordinate system that can be readily manipulated by a computer program. This embodiment of the invention also includes a self-contained adhesive or epoxy dispensing feature which can apply a suitable material such a epoxy resin to the filaments before they are wound on the mandrel.

Referring to FIGS. 8 and 9, the winder generally designated 101 comprises a support 102 which is fixed to a robot arm by a connecting flange 136. Winding head 114 is rotatably mounted on support 102 on bearings 190, 192. Bearings 190 and 192 rotatably mount hollow shaft 194. One one end of hollow shaft 194 is a rotatably flange 198 to which is connected a spool cage or frame 195 over angle irons 199. Four spools 197 are rotatably mounted on their respective axes to spool frame 195 and are also rotatable as a whole on the axis of winding head 114. A filament 110 is supplied from each spool 197, over a farrow or opening 193 in flange 198 and through hollow shaft 194. The four filaments are guided through four openings in a first eye bracket 119, over a guide roller 128 and through four eyes in a second eye bracket 118. Mounted on bracket 118 are one or more spray nozzles 203 which are supplied with adhesive or epoxy liquid by hoses 204 from a reservoir 202. Reservoir 202 is pressurized by a pressure source 201 which can for example be a $CO_2$ cartridge so that the assembly 201, 202 is self-contained and can be mounted on the winding head 114.

To support the liquid spraying equipment, winding head 114 includes a drum 115 which is fixed to an end of hollow shaft 194 remote from frame 195.

An arm 184 is slidably mounted in drum 115 on a linear bearing 116 and includes a rack on its top surface which is engaged by a gear 117 that is rotated by a servo motor 125. Servo motor 125 can be controlled to provide movement of arm 184 in the axial or X direction. First eye bracket 119 is mounted at a fixed but adjustable position on arm 184.

An outer end of arm 184 supports a linear bearing 186 which slidably receives a radial arm 185. Radial arm 185 includes a rack which is engaged by a gear 187. Gear 187 is rotated by a servo motor 189 to move radial arm 185 in the radial or R direction. This moves the eyes of second eye bracket 118 to a selected radial position. By using servo motors 120, 125 and 189, a computer program can manipulate the exact position of the eyes in bracket 118 and thus closely control the winding process. To provide appropriate signals to the servo motors 125 and 189, a plurality of slip rings 132 are mounted on the inner surface of support 102 which electrically engage slip rings 134 mounted on the outer surface of drum 115. Electrical lines connected to slip rings 132 can be conducted through or over the robot arm to either the robot controller or appropriate interfaces for the computer to provide signals to the servo motors.

To give the computer information concerning the exact position in the rotational $\theta$ direction, servo motor 120 is provided with an encoder/resolver which is commercially available and is provided as part of some servo motors. Feedback for the Z direction is provided by a linear digitizing slides schematically shown at 171. These position sensing devices are also commercially available.

A position in the R or radial direction is sensed for example by a proximity sensor 171 which can be mounted to arm 194 below the bracket 118 to sense the R coordinate. This too is a commercially available device.

Any other types of sensors can also be utilized within the scope of the present invention for determining the cylindrical coordinate extablished by servo motors 120, 125 and 189.

The signals from these sensors can be provided for example over slip rings 132,134, or by other means which are not illustrated.

Figure 10:
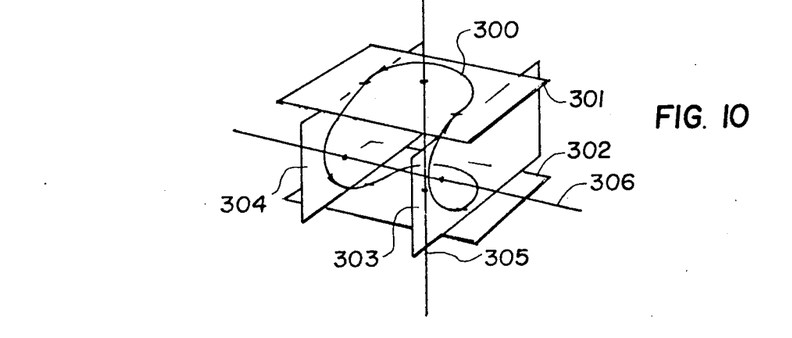
FIG. 10 is a schematic perspective view showing a complex path which can be followed by the winder, in a plurality of planes, utilizing cylindrical coordinates.

FIG. 10 shows the path shows the path which can be taken by a winding filament at 300, using the inventive winder. This filament can be wound in four distinct planes labelled 301 to 304. The path 300 can be used for example for winding a helicopter hub having two separate axes of rotation which are orthogonal to each other and spaced apart in the horizontal plane. These two axes are labelled 305 and 306. Unlike the simpler winding schemes shown in FIGS. 6 and 7, where the robot is utilized as an indexing device in one plane, the winding requirement of FIG. 10 requires the robot to reorient the winding head from one plane to another, for example from plane 102 to plane 304. This is assuming winding in path 100 in the direction of the arrows along that path. While the winding head of the invention can be used to wind filament within one of the planes, the robot must be relied upon for a transition movement from one plane to another.

To wind a complex shape using the invention, personal computer 42 is programed to access a so called CAD (computer aided design) data base which are commercially available and mathematically define the particular shape to be wound.

The program for computer 42 includes an algorithm which converts the CAD information into cylindrical coordinate segments. These coordinate segments are for movement in any one of the planes shown for example in FIG. 10. For complex shape requiring transition from one plane to another, a complex robot manipulation is required which can also be controlled by an algorithm in the program.

A personal computer can also be programmed to generate simulation for the winding process before the actual process is physically conducted. This can produce analysis of filament tensions and resin requirements for the liquid dispensing means 201-204. Pay out speeds and feed rates can also be determined.

In conducting the actual winding process, the feedback elements 102,171 and 172 can be utilized to trace all axes positions. It is noted that the embodiment of FIGS. 8 and 9 can also be outfitted with a photo sensor as are the embodiments of FIGS. 3 and 5 to provide redundancy with the encoder 121.

While specific embodiments of the invention has been shown and described in detail to illustrate the application of the principles of the invention, it will be understood that the invention may be embodied otherwise without departing from such principles.

What is claimed is:

1. A method of winding a filament on a mandrel using a winder, having a winder support and a rotatable winding head for feeding a filament in a circular path and a filament eye, for dispensing filament, connected to the winding head, positionable in a radial direction with respect to the winding head, the method comprising the steps of:

indexing the winder to a first selected position with respect to the mandrel with the winding head facing the mandrel, said indexing being accomplished using a robot manipulator having at least four degrees of freedom and being controllable for indexing the winder to a plurality of selected positions with respect to the mandrel;

rotating the winding head by a selected amount for at least partly winding a filament around the mandrel;

positioning the filament eye in a radial direction with respect to the winder head;

indexing the winder to a second position with respect to the mandrel;

again rotating the winding head for at least partly winding filament on the mandrel;

again positioning the filament eye in radial direction with respect to the winder head;

maintaining the mandrel at a selected location and in a selected position with respect to the winder, the winder being indexed to a plurality of locations around the mandrel, the winding head being rotated with respect to the winder support and the filament eye being positioned with respect to the winding head, for winding filament on the mandrel in a selected pattern.

2. A method according to claim 1, wherein filament is supplied from a spool, including rotating the spool with rotation of the winding head for winding filament on the mandrel, to avoid twisting filament as it is dispensed from the spool.

3. A method according to claim 1 wherein the filament eye is connected to the winding head to be positionable in both an axial and the radial direction, said method including positioning the filament eye in an axial and the radial direction with respect to the winder head, and maintaining the filament at a fixed selected location and in a fixed selected position.

4. A winding system for winding a filament on a mandrel, comprising:
   a winder support;
   a winding head rotatably mounted to said support for dispensing a filament;
   drive means connected to said winding head for rotating said winding head;
   a filament eye connected to said winding head;
   means for moving said filament eye radially with respect to said winding head;
   robot means having a manipulator connected to said winder support for indexing said winder support to a plurality of winder locations around a mandrel for winding a mandrel with filament in a selected pattern, said manipulator comprising a base and a plurality of manipulator limbs articulated to each other and to said base for a plurality of degrees or freedom, said winder support being connected to one or said manipulator limbs; and
   a mandrel support for supporting a mandrel at a selected location with respect to said robot means.

5. A winding system according to claim 4, said mandrel support supports a mandrel at a fixed location with respect to said robot means and in a fixed position at said fixed location.

6. A winding system according to claim 5 including control means connected to said robot means and to said drive means for correlating movement of said manipulator and said drive means to form a selected pattern winding for filament on a mandrel.

7. A winding system according to claim 6, including a filament spool rotatably mounted on said winding head and movable with said winding head and a filament eye connected to said winding head and rotatable with said winding head and said spool for dispensing filament in a circular path with rotation of said winding head.

8. A winding system according to claim 7, wherein said spool includes an axis of rotation extending transversely to an axis of rotation of said winding head.

9. A winding system according to claim 1, wherein said manipulator comprises a base, a turntable rotatably mounted on said base for first degree of freedom, a first limb pivotally mounted to said turntable about an axis transverse to an axis of rotation of said turntable for a second degree of freedom, a second limb pivotally mounted to said first limb about an axis parallel to said pivotal axis of said first limb for a third degree of freedom, a third limb pivotally mounted to said second limb about an axis parallel to a pivotal axis of said second limb for a fourth degree of freedom third limb being connected to said winder support.

10. A winding system according to claim 9, including a rotation connection connected between said third limb and said winder support to form a fifth degree of freedom, said rotatable mounting of said winding head representating a sixth degree of freedom.

11. A winding system according to claim 10, wherein the axis of rotation of said winding head is perpendicular to an axis of rotation of said rotatable connection.

12. A winding system according to claim 1, wherein said winding head comprises a winding frame, a filament spool for storing filament rotatably mounted to said winding frame, a shaft connected to said winding frame and rotatably mounted to said winder support for rotatably supporting said frame, a filament arm connected to said shaft and extending at least partly radially of said shaft out of said support, said filament eye connected to said arm and movable in a circular path with rotation of said winding frame for dispensing filament.

13. A winding system according to claim 12, wherein said drive means comprises a first gear connected to said shaft, a motor connected to said support and having a motor shaft a second gear connected to said motor shaft and a toothed belt engaged between said first and second gears for rotation of said winding frame shaft with rotation of said motor shaft.

14. A winding system according to claim 13, including a counterweight arm connected to said winding frame shaft, said spool mounted for rotation between said filament arms and said counterweight arm on an axis transverse to an axis of rotation of said winding frame, said winder support being cylindrical, means connected to said winder support defining a circular track, and a slide member connected to said filament and to said counterweight arm slidably mounted in said track for rotatably guiding said winder frame on said winder support.

15. A winding system according to claim 13, wherein said spool is mounted for rotation an axis which is perpendicular to an axis of rotation of said winding frame.

16. A winding system according to claim 12, wherein said arm comprises an axial arm portion slidably mounted to said shaft for axial motion with respect thereto, and a radial arm portion slidably mounted to said axial arm portion for radial motion with respect to the shaft axis and for guiding filament radially.

17. A winding system according to claim 16, said means for moving including axial drive means connected to said axial arm portion for moving said axial arm portion axially and radial drive means connected to said radial arm portion for moving said radial arm portion radially.

18. A winding system according to claim 17, including a first sensor associated with said axial arm portion for sensing an axial position of said axial arm portion, a second sensor associated with said radial arm portion for sensing a radial position of said radial arm portion and a third sensor associated with said winding head for sensing a rotational position of said winding head.

19. A winding system according to claim 18, including a drum connected to said shaft and rotatably mounted on said winder support, said shaft carrying said axial arm portion for linear motion.

20. A winding system according to claim 16, including liquid spray means connected to said winding head for spraying liquid on filament payed out by said winding head.

21. A winding system according to claim 19, wherein said shaft is hollow, filament from said filament spool extending through said hollow shaft to said filament eye and from said filament eye into engagement with said radial arm portion, said drum which is connected to said shaft carrying said axial arm portion for linear motion, said winder support comprising a second drum to which said hollow shaft is rotatably connected, said first mentioned drum being rotatably mounted in said second drum.

* * * * *